(12) United States Patent
Bellotte et al.

(10) Patent No.: US 8,952,304 B2
(45) Date of Patent: Feb. 10, 2015

(54) ROCKET NOZZLE ASSEMBLY

(75) Inventors: Joseph O. Bellotte, Christinsburg, VA (US); Thomas F. Farabaugh, Christinsburg, VA (US); Aaron C. Caba, Blacksburg, VA (US)

(73) Assignee: Alliant Techsystems, Inc., Minneapolis, MN (US)

( * ) Notice: Subject to any disclaimer, the term of this patent is extended or adjusted under 35 U.S.C. 154(b) by 1071 days.

(21) Appl. No.: 13/182,686

(22) Filed: Jul. 14, 2011

(65) Prior Publication Data

US 2014/0291441 A1    Oct. 2, 2014

Related U.S. Application Data

(60) Provisional application No. 61/448,837, filed on Mar. 3, 2011.

(51) Int. Cl.
   *F42B 15/01*    (2006.01)

(52) U.S. Cl.
   USPC .................. 244/3.28; 244/3.24; 244/3.27

(58) Field of Classification Search
   USPC ............... 244/3.24, 3.27, 3.28, 3.29
   See application file for complete search history.

(56) References Cited

U.S. PATENT DOCUMENTS

| | | | |
|---|---|---|---|
| 2,405,415 A * | 8/1946 | Eksergian | 244/3.23 |
| 4,203,569 A | 5/1980 | Marks | |
| 5,619,851 A | 4/1997 | Johnson et al. | |
| 6,571,715 B1 * | 6/2003 | Bennett et al. | 102/439 |
| 6,588,700 B2 * | 7/2003 | Moore et al. | 244/3.28 |
| 6,764,042 B2 * | 7/2004 | Moore et al. | 244/3.28 |
| 6,779,754 B2 * | 8/2004 | Hellman | 244/3.27 |
| 7,628,353 B2 | 12/2009 | Peterson | |
| 2003/0071166 A1 * | 4/2003 | Moore et al. | 244/3.28 |

FOREIGN PATENT DOCUMENTS

| | | |
|---|---|---|
| GB | 976483 | 11/1964 |
| WO | 0206759 | 1/2002 |

OTHER PUBLICATIONS

Carlson, Pao, and Abdol-Hamid, "Computational Analysis of Vented Supersonic Exhaust Nozzles Using Multiblock/Multizone Strategy" Journal of Propulsion and Power, vol. 9, No. 6, Nov.-Dec. 1993, 834-839.

* cited by examiner

*Primary Examiner* — Tien Dinh
*Assistant Examiner* — Michael Wang
(74) *Attorney, Agent, or Firm* — Vidas, Arrett & Steinkaus (57) ABSTRACT

In one example, a rocket nozzle assembly is disclosed that has stowed and deployed positions, and includes a casing including an outer wall and an inner surface, at least a portion of the inner surface defining a diverging region, wherein the casing defines a plurality of fin slots, and wherein each of the plurality of fin slots extend through the outer wall of the casing and the inner surface of the casing, and wherein the diverging region defines a bell-shaped contour. The assembly further includes a plurality of fins pivotally engaged to the casing, wherein in the stowed position, each of the plurality of fins extends into the diverging region through a respective one of the fin slots, and wherein in the deployed position, each of the plurality of fins extend outwardly from the casing.

15 Claims, 11 Drawing Sheets

ROCKET NOZZLE ASSEMBLY

This application claims the benefit of U.S. Provisional Application No. 61/448,837, entitled, "ROCKET NOZZLE ASSEMBLY," by Joseph Bellotte, Thomas Farabaugh, and Aaron Caba, and filed on Mar. 3, 2011, the entire contents of which being incorporated herein by reference.

TECHNICAL FIELD

The disclosure relates to high velocity projectiles and, more particularly, to rocket nozzles.

BACKGROUND

In general, a rocket nozzle includes three sections: a converging section, a diverging section, and a throat section positioned between the converging and diverging sections. Combustion products from a rocket motor enter the rocket nozzle at the converging section, generating high pressure, high temperature gases that flow out of the converging section via the throat section. The throat section is a constricted region that forces the gas to accelerate as it enters the diverging section.

As the gas passes through the diverging section, the pressure and temperature of the gas decreases, but the velocity of the gas greatly increases. The velocity of the gas at the exit of the diverging section, or exhaust velocity, multiplied by the rate at which mass is ejected from the diverging section, or mass flow rate, equals a portion of the overall thrust of the rocket, namely the momentum thrust, which propels the rocket. Depending on the design of the nozzle and the altitude at which the rocket is operating, the overall thrust of the rocket may further include a thrust component referred to as pressure thrust. Pressure thrust is a function of the area of the nozzle exit and the difference in pressure between the gas at the nozzle exit and the atmospheric pressure.

Rockets often include fins, which may be engaged to the rocket nozzle. The fins increase the stability of the rocket and provide lift to increase the range of the rocket.

SUMMARY

This disclosure generally describes a longitudinally slotted rocket nozzle having a contour designed to minimize the amount of unwanted thrust vectoring caused by slot asymmetries. Using various techniques of this disclosure, any thrust asymmetries caused by the longitudinal slots can be mitigated. In addition, the rocket nozzle assembly of this disclosure allows longitudinal fins to be stowed within the rocket nozzle prior to ignition, thereby allowing use of larger fins, for example.

In one example, this disclosure is directed to a rocket nozzle assembly having a stowed position and a deployed position, the assembly comprising a casing comprising an outer wall and an inner surface, at least a portion of the inner surface defining a diverging region, wherein the casing defines a plurality of longitudinal fin slots, and wherein each of the plurality of fin slots extend through the outer wall of the casing and the inner surface of the casing, and wherein the diverging region defines a bell-shaped contour. The assembly further comprises a plurality of fins pivotally engaged to the casing, wherein in the stowed position, each of the plurality of fins extends into the diverging region through a respective one of the fin slots, and wherein in the deployed position, each of the plurality of fins extend outwardly from the casing.

In another example, this disclosure is directed to a small tactical rocket comprising a rocket nozzle assembly having a stowed position and a deployed position, the assembly comprising a casing comprising an outer wall and inner surface, at least a portion of the inner surface defining a diverging region, wherein the casing defines a plurality of longitudinal fin slots, and wherein each of the plurality of fin slots extends through the outer wall of the casing and the inner surface of casing, and wherein the diverging region defines a bell-shaped contour. The assembly further comprises a plurality of fins pivotally engaged to the casing, wherein in the stowed position, each of the plurality of fins extends into the diverging region through a respective one of the fin slots, and wherein in the deployed position, each of the plurality of fins extend outwardly from the casing.

In another example, this disclosure is directed to a rocket nozzle assembly for a small tactical rocket having a stowed position and a deployed position, the assembly comprising a casing comprising an outer wall and an inner surface, at least a portion of the inner surface defining a diverging region, wherein the diverging region defines a shock-free bell contour, wherein the casing defines a plurality of longitudinal fin slots, wherein the fin slots are distributed symmetrically about the casing, and wherein each of the plurality of fin slots extend through the outer wall of the casing and the inner surface of the casing. The assembly further comprises six fins pivotally engaged to the casing, wherein in the stowed position, each of the fins extends into the diverging region through a respective one of the fin slots, wherein in the stowed position, each of the plurality of fins extends distally from a distal end of the casing, and wherein in the deployed position, each of the fins extend outwardly from the casing.

In another example, this disclosure is directed to a rocket nozzle assembly having a stowed position and a deployed position, the assembly comprising a casing comprising an outer wall and a nozzle insert structure positioned within the casing. The insert structure comprises an inner surface, at least a portion of the inner surface of the insert structure defining a diverging region, wherein the casing and the insert structure define a plurality of longitudinal fin slots, and wherein each of the plurality of fin slots extend through the outer wall of the casing and the inner surface of the insert structure, and wherein the diverging region defines a bell-shaped contour. The assembly further comprises a plurality of fins pivotally engaged to the casing, wherein in the stowed position, each of the plurality of fins extend into the diverging region through respective ones of the fin slots, and wherein in the deployed position, each of the plurality of fins extend outwardly from the casing.

The details of one or more aspects of the disclosure are set forth in the accompanying drawings and the description below. Other features, objects, and advantages will be apparent from the description and drawings, and from the claims.

DETAILED DESCRIPTION

In general, this disclosure describes a longitudinally slotted rocket nozzle for a rocket, e.g., a small tactical rocket, having a contour designed to minimize the amount of unwanted thrust vectoring caused by longitudinal fin slot asymmetries. The longitudinal fin slots provide, among other things, expansion optimization and fin stowage prior to ignition on supersonic converging-diverging rocket nozzles. Asymmetries in the longitudinal fin slots, e.g., caused by slot width tolerances, can lead to large thrust asymmetries and develop large, unwanted thrust vectoring that can adversely impact the performance of the projectile. In accordance with certain techniques described in this disclosure, thrust asymmetries can be mitigated by utilizing a bell shaped nozzle contour that minimizes the internal nozzle pressure integral over the wall of the nozzle, or exit cone wall.

A thrust vector of a rocket nozzle is generally in the direction of the rocket's longitudinal axis and goes through the rocket's center of gravity. Thrust misalignment, caused by thrust asymmetries, is thrust directed in an undesired direction, which can result in rocket instability by causing an unwanted rotational moment about the rocket's center of gravity. Mitigating thrust asymmetries can lead to significant improvement in the flight characteristics of a projectile utilizing a rocket nozzle design that minimizes unwanted thrust vectoring while maintaining the advantages of the longitudinally slotted nozzle design.

Longitudinal fin slots produce transverse thrust that, if unbalanced by an opposite thrust, results in a thrust misalignment. The source of the thrust misalignment is a function of two main factors: external flow asymmetries and machining asymmetries. The external flow asymmetries are caused by the angle of attack of the rocket and roll orientation, both of which are beyond the scope of this disclosure.

The machining asymmetries are a function of the pressure distribution along the nozzle surfaces, both interior and exterior, as well as acceptable and realistic machining tolerances for the fin slots. Using certain techniques described in this disclosure, thrust asymmetries caused by the machining asymmetries of the fin slots are minimized by utilizing a bell-shape for the contour of the diverging region of the nozzle. In particular, the bell-shaped contour of the diverging region of the nozzle minimizes the pressure differential between the internal nozzle flow and the external ambient pressure, therefore minimizing the cross flow through the longitudinal fin slots.

Because of the tendency of the exhaust flow to separate from the nozzle wall in the case of extreme or abrupt expansion angles in the diverging section, a two-dimensional computational fluid dynamics analysis was used to predict the pressure profiles on the nozzle wall, including the separation points and total pressure losses due to shock. To estimate the transverse force created by the exhaust flow through asymmetrically machined nozzle slots, the two-dimensional pressure profile is integrated over the radius of the nozzle as described below with respect to equations (1)-(5).

The transverse force experienced by the nozzle can be expressed as the following:

$$\vec{F}_{noz} = \iint P dA \quad (1)$$

where P is the pressure on an area A of the nozzle wall.

Equation (1) can be written as the following:

$$\vec{F}_{noz} = \iint (P_{noz} - P_{atm}) dz dy \quad (2)$$

where z is the axial direction along the nozzle centerline, y is an arbitrary circumferential axis, $P_{noz}$ is the internal nozzle pressure, and $P_{atm}$ represents the atmospheric pressure. In Equation (2), it should be noted that dzdy is the differential area of a longitudinal slot. The thrust misalignment is represented by the ($P_{noz} - P_{atm}$) term in Equation (2). When ($P_{noz} - P_{atm}$) is minimized, thrust asymmetries caused by physical asymmetries in the longitudinal fin slots are minimized.

Assuming that the pressure distribution about the radius of the nozzle is symmetric, the integral of the pressure with respect to x can be considered to be a constant, c. The differential projected area in the transverse direction of interest dy can be expressed as the following:

$$dy = r \cdot \cos \theta d\theta \quad (3)$$

where θ is the angle from the direction of interest and r is the radius from the nozzle centerline to the point of application of the pressure force.

Substituting these relations into Equation (1), the expression becomes:

$$\vec{F}_{noz} = cr \int_{\theta_1}^{\theta_2} \cos \theta d\theta \quad (4)$$

where $\theta_1$ and $\theta_2$ represent radial angles through which the pressure profile will be integrated.

Integrating Equation (4) results in the following:

$$\vec{F}_r = cr(\sin \theta_2 - \sin \theta_1) \quad (5)$$

where r is the direction of thrust misalignment.

Using the above result and the pressure integral calculated using a computational fluid dynamics (CFD) analysis, the thrust misalignment angle was approximated for four different nozzle contours with various slot widths and slot width tolerances, widening three slots to their maximum tolerance value and narrowing the opposite slots to their minimums. As described below and as seen graphically in FIGS. 2-4, the use of an optimized bell-shaped contour results in the lowest nozzle wall pressure, the lowest nozzle wall temperature, and the lowest thrust misalignment angle of all four designs. An optimized bell-shaped contour is a contour that follows an extreme streamline of the exhaust gas exiting the nozzle. With an optimized bell-shaped contour, the exhaust flow remains attached to the wall of the nozzle, and the contour minimizes the pressure inside the nozzle exit cone at any given axial position in the nozzle. In comparison to the non-optimized bell-shaped contour analyzed, the optimized bell-shaped contour has been mathematically resolved to produce the shortest possible nozzle for a given expansion ratio without creating an oblique shock. The terms optimized bell-shaped contour and "shock-free bell contour" are used interchangeably throughout this disclosure.

Figure 1A:
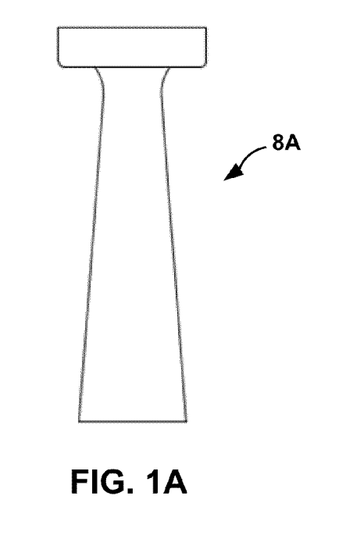
FIGS. 1A-1D depict four example rocket nozzle contours.
Figure 1B:
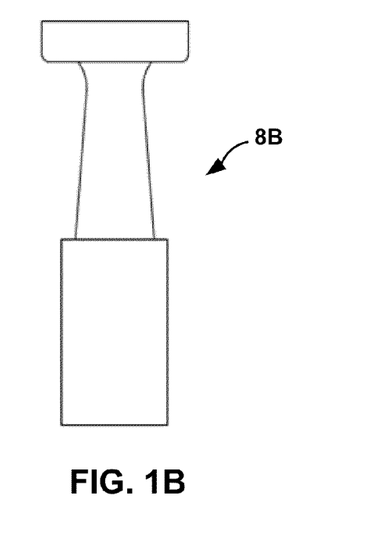

FIGS. 1A-1D depict four rocket nozzle contours. FIG. 1A depicts a conical nozzle contour, shown generally at 8A. FIG.

Figure 1C:
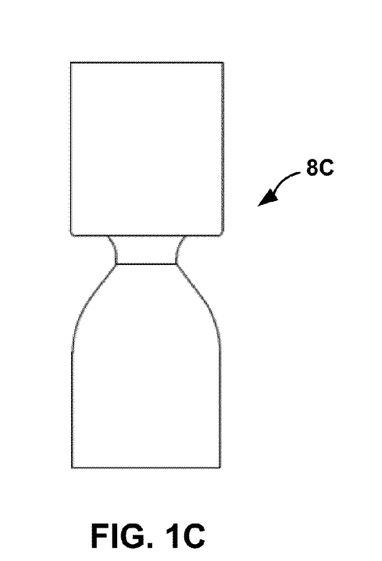
Figure 1D:
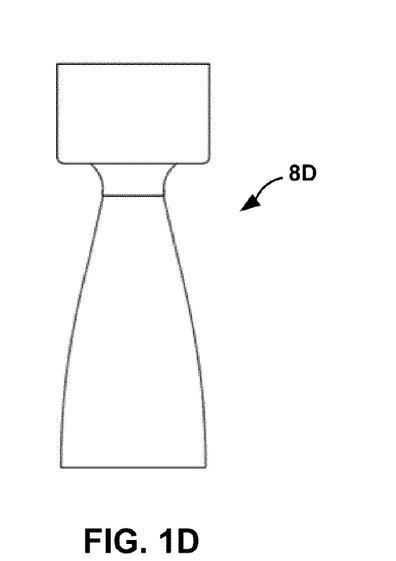

1B depicts a cylindrical nozzle contour, shown generally at 8B. FIG. 1C depicts a non-optimized bell contour, shown generally at 8C. Finally, FIG. 1D depicts an optimized bell contour, or shock-free bell contour, shown generally at 8D. As described in detail below, optimized bell contour 8D of FIG. 1D provides a nozzle that includes longitudinal fin slots with the lowest thrust misalignment among the four nozzle contours shown in FIGS. 1A-1D.

Figure 2:
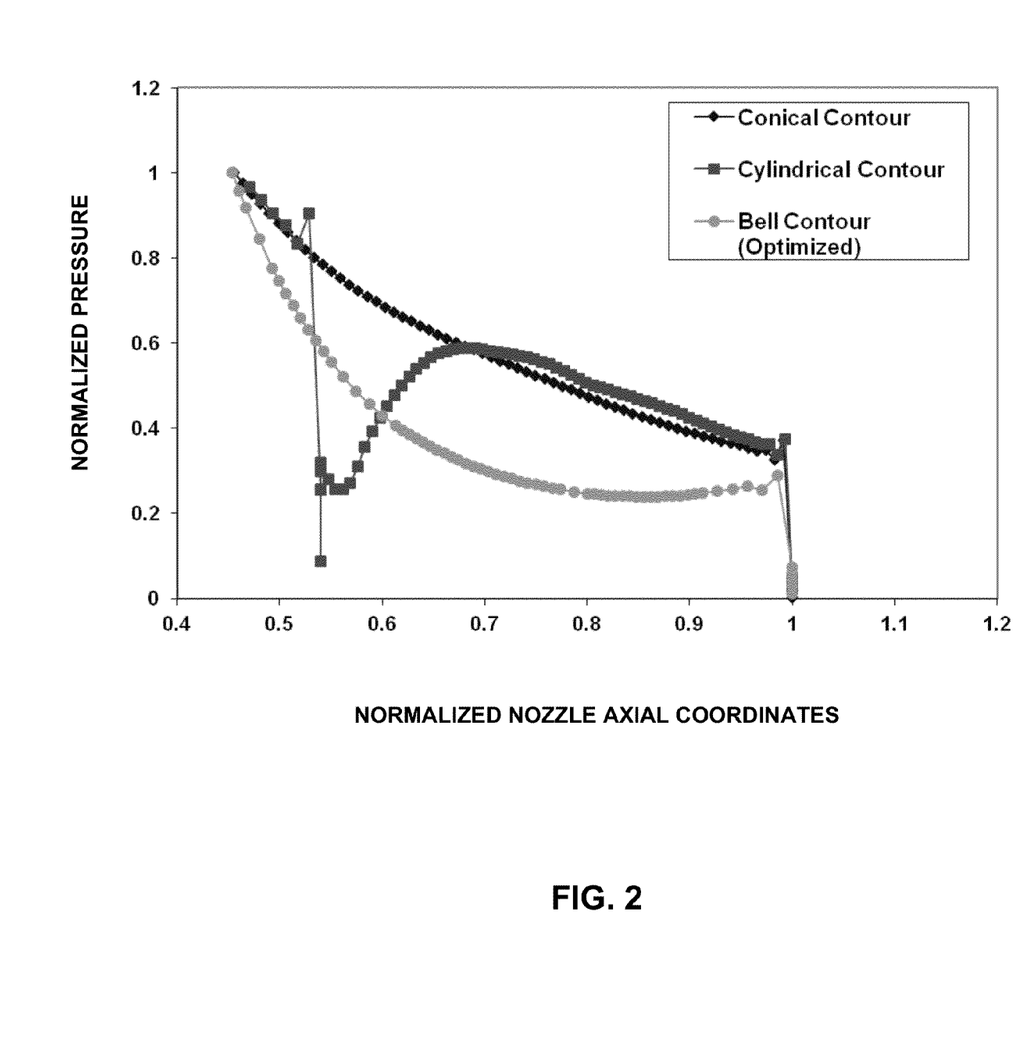
FIG. 2 is a graph depicting nozzle wall pressure for various nozzle contours.

FIG. 2 is a graph depicting nozzle wall pressure for various nozzle contours of a small tactical rocket that incorporates longitudinal fin slots. In FIG. 2, the y-axis represents normalized pressures and the x-axis represents normalized nozzle axis coordinates. FIG. 2 depicts the pressure distribution from the axial location of the slot entrance to the nozzle exit plane calculated for three nozzle contours using a two-dimensional CFD analysis. In accordance with this disclosure, the optimized bell contour, or shock-free bell contour, has the smallest pressure integral value over the nozzle length, whereas the conical and cylindrical contours exhibit significantly higher pressure integral values over the nozzle length.

Figure 3:
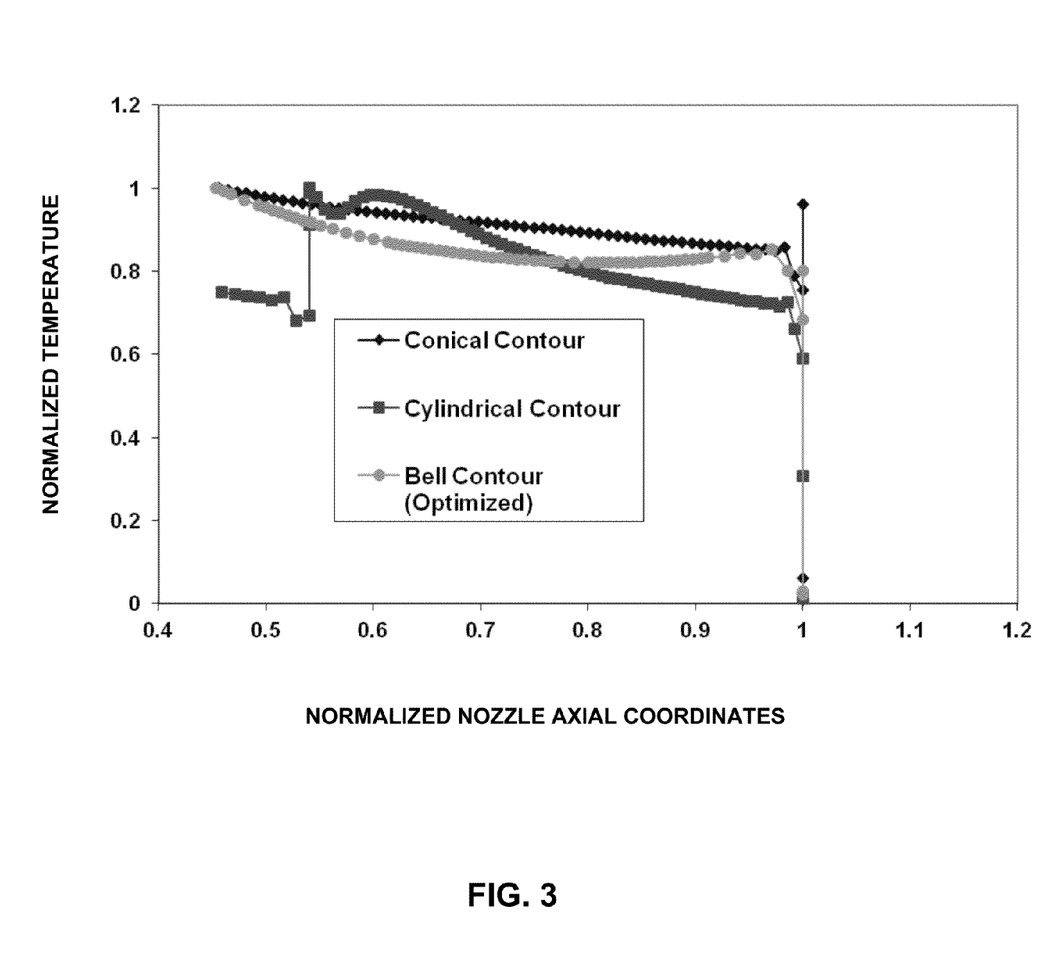
FIG. 3 is a graph depicting nozzle wall temperatures for various nozzle contours

FIG. 3 is a graph depicting nozzle wall temperatures for various nozzle contours of a small tactical rocket that incorporates longitudinal fin slots. In FIG. 3, the y-axis represents normalized temperatures and the x-axis represents normalized nozzle axis coordinates in inches. FIG. 3 depicts nozzle temperature profiles calculated for three nozzle contours using the two-dimensional CFD analysis. As seen in FIG. 3, the cylindrical contour exhibits wall temperatures at some coordinates more than 34% higher than that of the optimized bell shape, or shock-free bell contour, determined using certain techniques of this disclosure.

Figure 4:
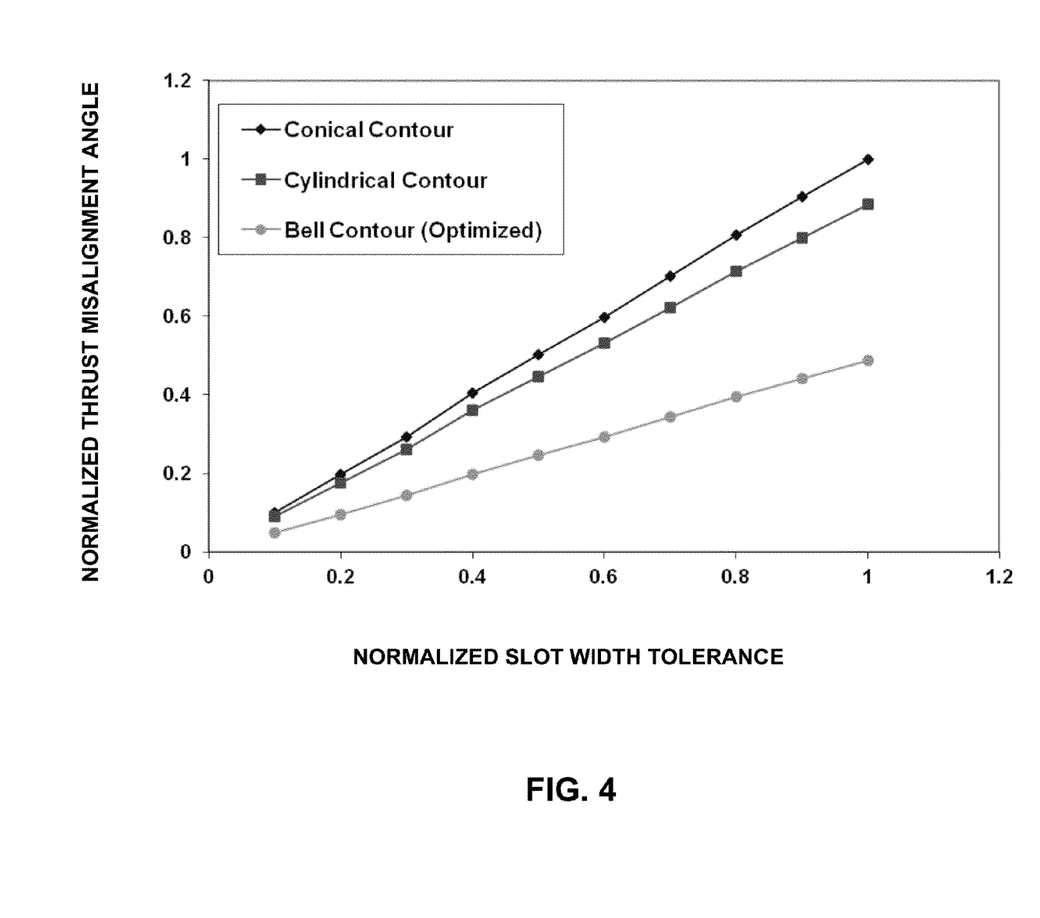
FIG. 4 is a graph depicting thrust misalignment angles for various nozzle contours.

FIG. 4 is a graph depicting thrust misalignment angles for various nozzle contours of a small tactical rocket that incorporates longitudinal fin slots. In FIG. 4, the y-axis represents normalized thrust misalignment angles and the x-axis represents normalized slot width tolerances. FIG. 4 depicts the thrust misalignment angle evaluated over a range of slot width tolerances for three nozzle contours, namely conical, cylindrical, and optimized bell contour. As seen in FIG. 4, in accordance with this disclosure, the optimized bell contour, or shock-free bell contour, produces the lowest thrust misalignment angles of all the contours over the entire range of slot width tolerances evaluated.

The classical conical nozzle contour, which is used on many small tactical rocket nozzles, creates the largest values of thrust misalignment of all the evaluated contours. The use of the optimized bell shaped contour, or shock-free bell contour, in a small tactical rocket nozzle, in accordance with this disclosure, effectively reduces the transverse thrust force of the nozzle caused by the addition of the longitudinal fin slots by 56%, the largest reduction of all the evaluated nozzle contours.

Both the cylindrical and non-optimized bell contours exhibit reduced transverse thrust forces, but flow separation was exhibited for both of these nozzle shapes. Flow separation exhibited by the cylindrical and non-optimized bell contours resulted in a loss of nozzle efficiency as well as the chance for enhanced nozzle erosion at the point of separation and shock interaction with the nozzle wall. The chance for enhanced nozzle erosion is due to the increased temperature, residence time, and heat transfer at these locations. As such, the use of the optimized bell contour, or shock-free bell contour, with a small tactical rocket nozzle minimizes the thrust misalignment associated with asymmetries in longitudinal fin slots.

Figure 5A:
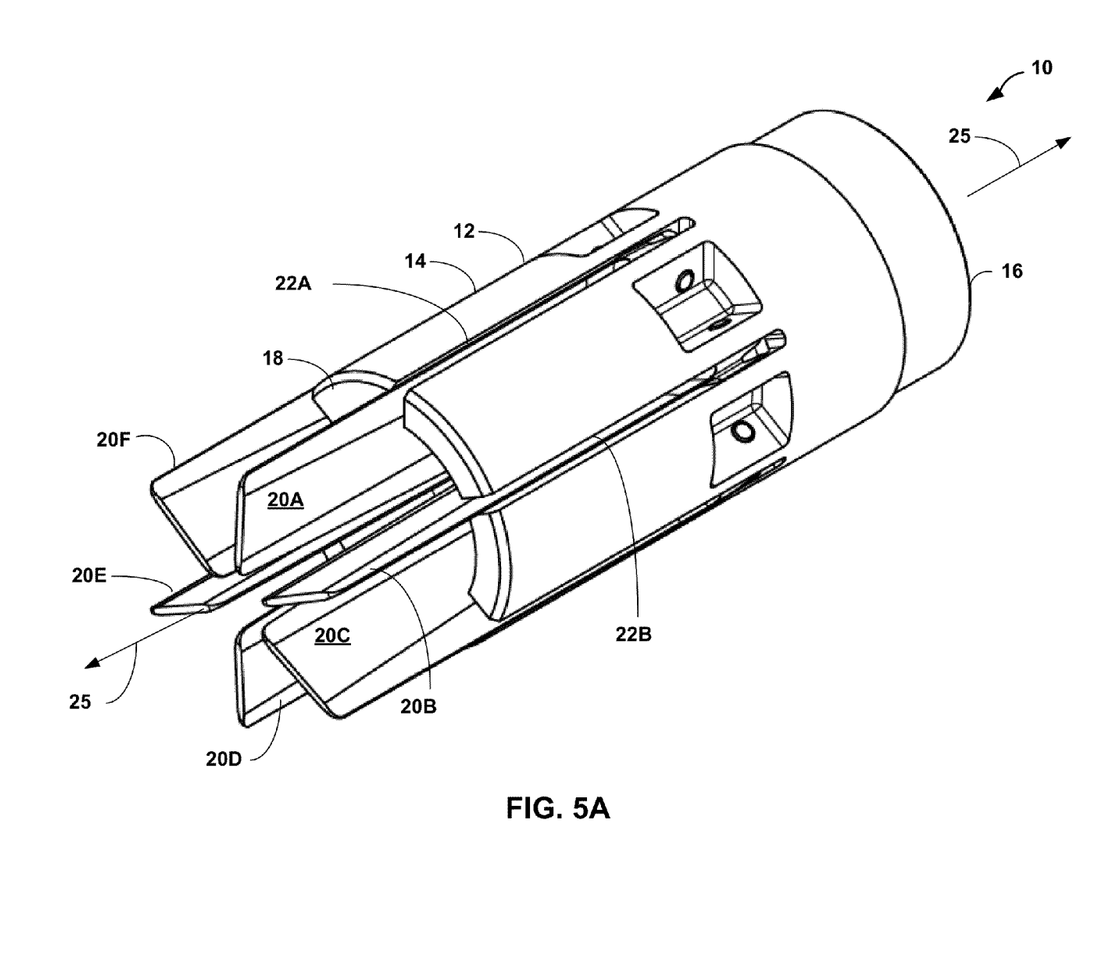
FIG. 5A is an isometric view of an example rocket nozzle assembly in a stowed position, in accordance with this disclosure.

FIG. 5A is an isometric view of an example rocket nozzle assembly in a stowed position, in accordance with this disclosure. In particular, FIG. 5A depicts an example rocket nozzle assembly in a stowed position prior to ignition, shown generally at 10, that includes longitudinal fins stowed in the rocket nozzle. Rocket assembly 10 includes casing 12 having outer wall 14, forward end 16, and aft end 18. Example materials from which casing 12 may be made include steel, other metals, and/or composite materials.

Rocket assembly 10 further includes a plurality of longitudinal fins, e.g., fins 20A-20F, pivotally engaged to casing 12. Fins 20A-20F are referred to collectively in this disclosure as "fins 20". Although FIG. 5A depicts six fins, in some example configurations there may be more, or fewer fins, depending on the rocket application.

In accordance with this disclosure, fins 20 are stowed within the nozzle of rocket assembly 10 prior to ignition, as shown and described in more detail below. The plurality of fins, e.g., fins 20A-20F, extend into the nozzle through a corresponding plurality of longitudinal fins slots defined at least in part by casing 12. Only two longitudinal fins slots are depicted in FIG. 5A, e.g., fin slots 22A and 22B, which correspond with fins 20A and 20B.

As mentioned above, fins increase rocket stability and provide lift to increase the range of the rocket. By utilizing certain techniques of this disclosure, fins can be stored within the nozzle of the rocket assembly, thereby allowing the fins to be larger in size than designs that do not stow the fins within the nozzle. This increased fin size can provide additional lift to the rocket and thus provide an increase in range over other rocket assembly designs.

In the example assembly 10 depicted in FIG. 5A, fins 20 extend beyond aft end 18. In other example configurations, however, fins 20 may be shorter and confined within casing 12 in a stowed position such that they do not extend beyond aft end 18.

Figure 5B:
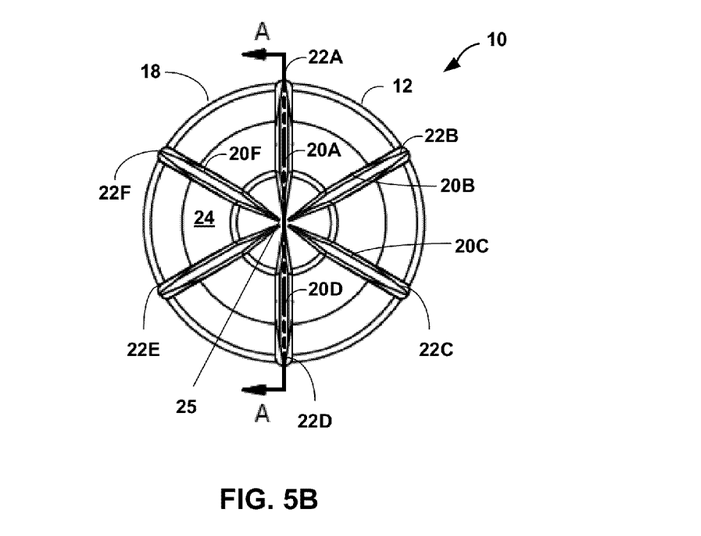
FIG. 5B is an end view of the rocket assembly depicted in FIG. 5A.

FIG. 5B is an end view of the rocket assembly depicted in FIG. 5A. As seen in FIG. 5B, fins 20A-20F extend through corresponding longitudinal fin slots 22A-22F (collectively referred to in this disclosure as "fin slots 22" or "slots 22") and into nozzle 24 of assembly 10. In the example configuration depicted in FIG. 5B, fin slots 22 are placed symmetrically around casing 12 and about longitudinal axis 25 of assembly 10 and form pairs of diametrically opposed fin slots. For example, fin slots 22A and 22D form a pair of diametrically opposed fin slots. In the example configuration of FIG. 5B, assembly 10 includes three pairs of diametrically opposed fins slots 22 and three pairs of fins 20. In other example configurations, assembly 10 may include two pairs, or four or more pairs, of diametrically opposed fins slots 22 and fins 20.

In other example configurations, fin slots 22 are placed symmetrically around casing 12 and about longitudinal axis 25 of assembly 10 and do not form pairs of diametrically opposed fin slots. For example, assembly 10 may include three fin slots, and three corresponding fins, spaced apart from one another by 120 degrees. In another specific example configuration, assembly 10 includes five fin slots and five fins. Of course, these are just two specific examples of fin and fin slot configurations; the disclosure is not limited to such example configurations. Rather, there are numerous other example symmetrical configurations that are within the scope of this disclosure and not specifically recited.

Figure 5C:
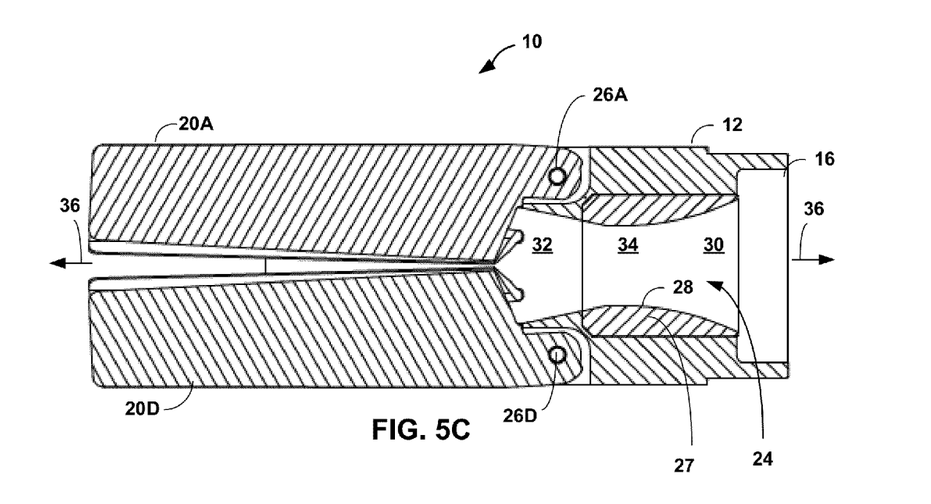
FIG. 5C is a sectional view of the rocket assembly depicted in FIG. 5A.

FIG. 5C is a sectional view of the rocket assembly depicted in FIG. 5A. In particular, FIG. 5C is a cross-sectional view taken along line A-A in FIG. 5B. As mentioned above, fins 20A and 20D are pivotably engaged to casing 12 via hinges 26A and 26D (collectively referred to in this disclosure as "hinges 26"), respectively, so that upon deployment, fins 20 may open outwardly out of the nozzle, shown generally at 24.

In the example configuration depicted in FIG. 5C, nozzle 24 is defined by nozzle insert structure 27, which is seated inside casing 12.

Nozzle insert structure 27 has inner surface 28 that defines a converging/diverging passageway with a throat region of restricted cross-sectional area. In particular, inner surface 28 of nozzle insert structure defines converging section 30, diverging section 32, and throat section 34 positioned between converging section 30 and diverging section 32. During operation of the rocket assembly 10, combustion products, including hot exhaust gases, are generated by the rocket assembly 10 and passed through throat section 34. Converging section 30, diverging section 32, and throat section 34 are disposed coaxially along nozzle longitudinal axis 36.

Nozzle insert structure 27 is designed to withstand the elevated temperatures and pressures generated by propellant combustion and the erosive effects caused by the high velocities at which the combustion products pass over inner surface 28 of nozzle insert structure 27. Generally, the choice of nozzle insert structure 27 material is dependent on mission parameters of the rocket assembly 10 (e.g., time and pressure) and the propellant selection. Carbon-based and silica-based materials are advantageous for use as nozzle insert structure 27 due to their ablative properties, inexpensive cost, and relatively low weight. Carbon-based and silica-based materials include, but are not limited to, carbon, silica, or graphite bulk and composite materials subject to carbonization or graphitization (known as carbon/carbon or graphite/carbon cloth), fiber-filled or powder-filled phenolic composites, and also a large array of metal or silicon carbides. Refractory metals and metal alloys are also occasionally used in rocket motors as nozzle insert structures 27 due to their high erosion resistance. Examples of such refractory materials are tungsten, rhenium, tantalum, and alloys containing one or more of these refractory metals. Nozzle insert structure 27 can also be made of layers of different materials. For example, a carbon or silica-based material can form an annular substrate, with one or more refractory metals or alloys applied (e.g., by a vacuum plasma spraying technique) as a radially inner shell on the substrate radially inner surface. Nozzle insert structure 27 can also be made of assemblies of different above-described materials in each of the converging, throat, and/or diverging regions.

As seen in FIG. 5C and in accordance with this disclosure, a portion of fins 20 are stowed within nozzle 24 prior to ignition. In particular, a portion of fins 20 are stowed within diverging section 32 of nozzle 24. As shown and described in more detail below, fin slots 22 (not shown in FIG. 5C) extend through outer wall 14 of casing 12 and inner surface 28 of nozzle insert structure 27. In the stowed position, as depicted in FIGS. 5A-5C, fins 20 extend through casing 12 and nozzle insert structure 27 and into diverging section 32 of nozzle 24. By utilizing the internal space of diverging section 32 of nozzle 24, the techniques of this disclosure allow the width of fins 20 to be maximized, if necessary, to provide additional lift and, consequently, increased range for the rocket. This is in contrast to other rocket nozzle assembly designs that stow fins 20 outside of nozzle 24.

It should be noted that the techniques of this disclosure can be implemented by a nozzle without a nozzle insert structure. That is, rather than using a nozzle insert structure, the casing of the nozzle, e.g., casing 12, is used to define the converging/diverging passageway with a throat region of restricted cross-sectional area. Such an example is shown and described in more detail below with respect to FIG. 7.

Figure 6A:
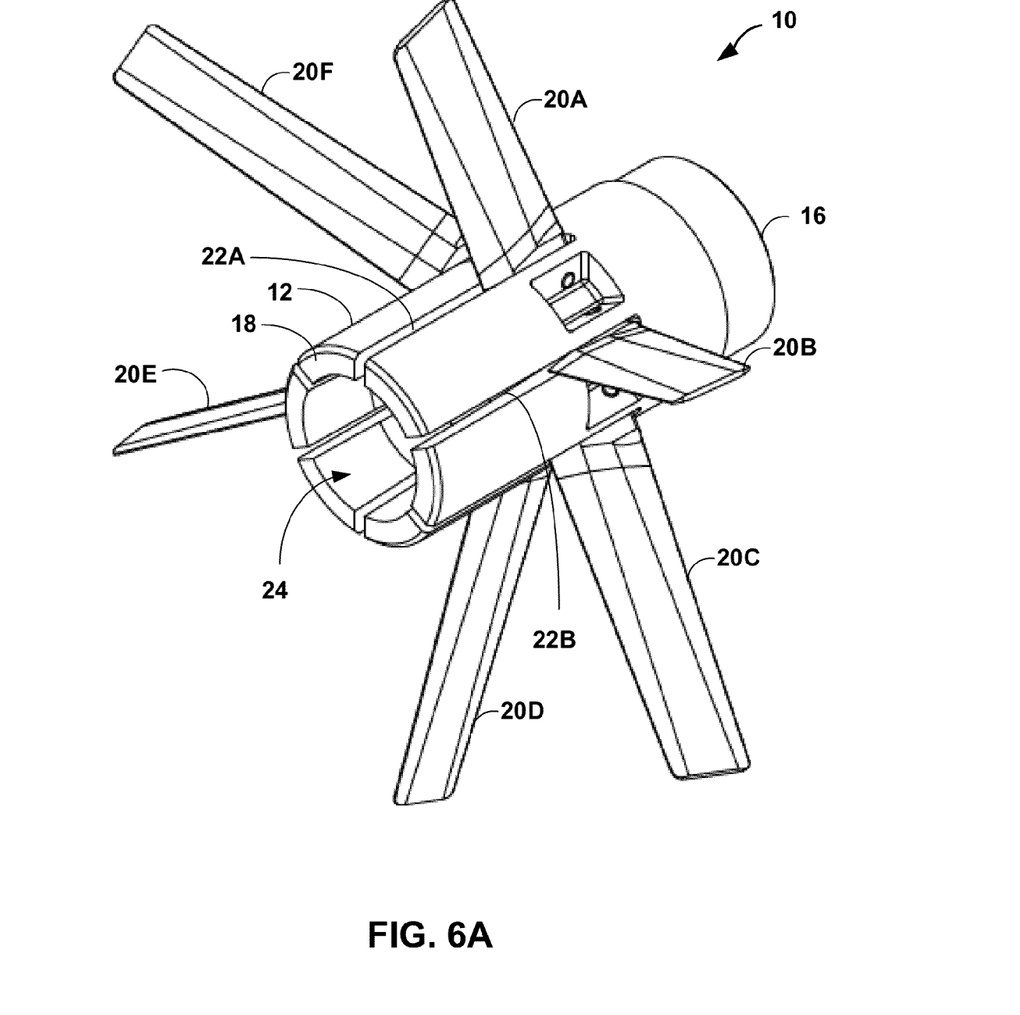
FIG. 6A is an isometric view of an example rocket nozzle assembly in a deployed position, in accordance with this disclosure.

FIG. 6A is an isometric view of an example rocket nozzle assembly in a deployed position, in accordance with this disclosure. In particular, in the deployed position, each of fins 20 pivot about respective ones of hinges 26 engaged to casing 12 and deploy through respective ones of fin slots 22. For example, fin 20A deploys through longitudinal fin slot 22A. In this manner, each of the plurality of fins 20 extend outwardly from casing 12 in the deployed position.

Figure 6B:
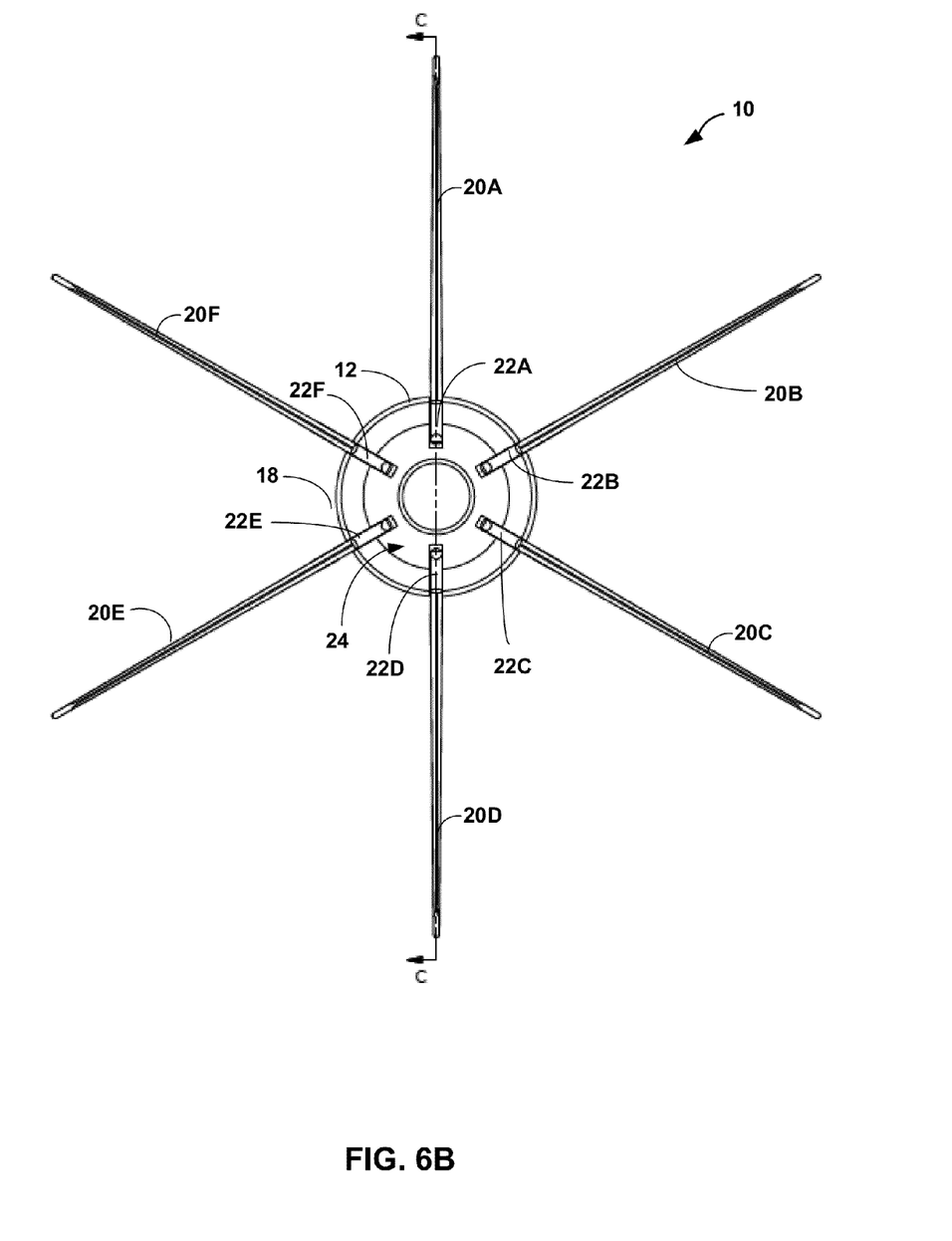
FIG. 6B is an end view of the rocket assembly depicted in FIG. 6A.

FIG. 6B is an end view of the rocket assembly depicted in FIG. 6A. In FIG. 6B, fins 20 have rotated outwardly from nozzle 24 and into a deployed position.

Figure 6C:
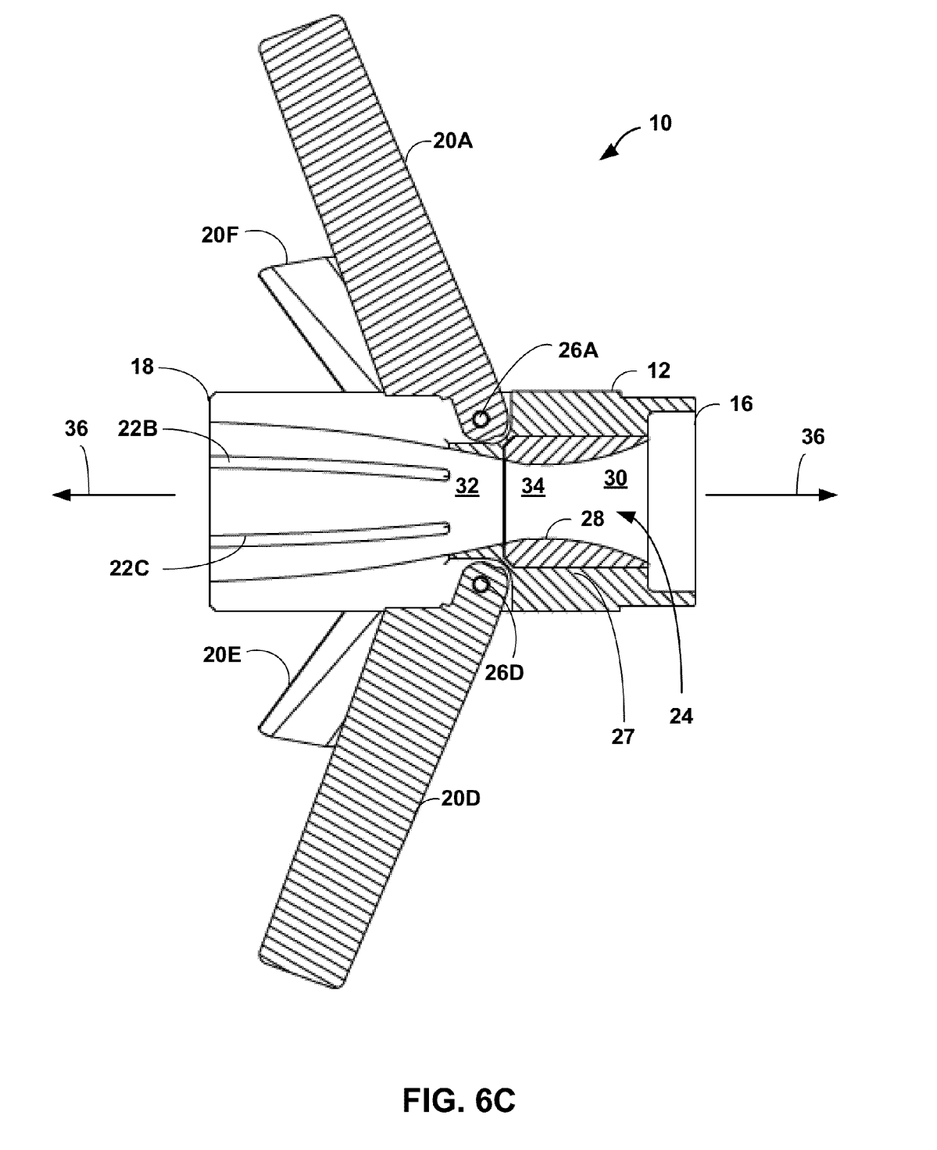
FIG. 6C is a sectional view of the rocket assembly depicted in FIG. 6B.

FIG. 6C is a sectional view of the rocket assembly depicted in FIG. 6B. In particular, FIG. 6C is a cross-sectional view taken along line C-C in FIG. 6B. As described in detail above, the machining tolerances of fin slots 22 result in physical asymmetries between fin slots 22 that cause unwanted thrust vectoring. However, using an optimized bell contour, or shock-free bell contour, for the nozzle, in accordance with this disclosure and as depicted in FIG. 6C, results in the minimum thrust misalignment angle possible for any given asymmetry in a fin slot.

An optimized bell contour, or shock-free bell contour, is a contour that follows an extreme streamline of the exhaust gas exiting the nozzle. As seen in FIG. 6C, inner surface 28 of nozzle 24 follows the optimized bell contour depicted at 8D in FIG. 1A. With an optimized bell contour, the exhaust flow remains attached to inner surface 28 of nozzle 24, and the contour minimizes the pressure inside diverging section 32 at any given longitudinal position in the nozzle. By minimizing the pressure inside diverging section 32 at any given longitudinal position, and thus minimizing the difference in pressure between the internal nozzle pressure ($P_{noz}$) and the atmospheric pressure ($P_{atm}$), thrust misalignment is minimized for any given physical asymmetry in a fin slot. Thus, using the techniques described in this disclosure, a rocket assembly is provided that includes longitudinal fin slots that allow fins to be stowed within a nozzle of the rocket assembly prior to ignition, and that includes a shock-free bell contour that minimizes any unwanted thrust vectoring that can result from physical asymmetries in the fin slots. The techniques of this disclosure are particularly suited for small tactical rockets, for example. Generally speaking, a small tactical rocket is rocket that uses solid fuel, has a diameter less than about 10 inches, and is employed in tactical combat situations.

Figure 7:
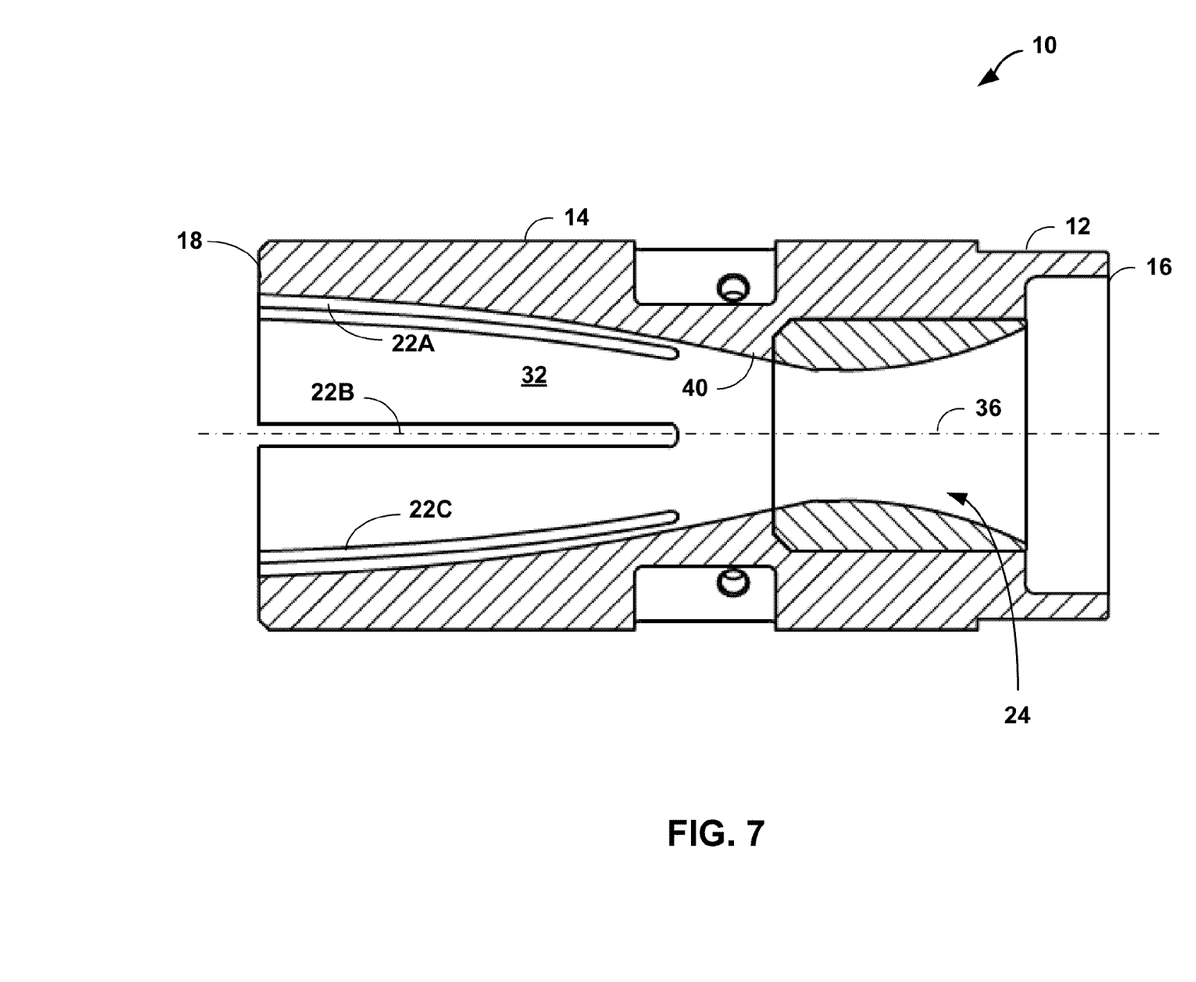
FIG. 7 is a sectional view of the casing of the rocket assembly depicted in FIG. 5A.

FIG. 7 is a sectional view of a casing of the rocket assembly that may be used to implement various techniques of this disclosure. As mentioned above, the casing of the nozzle, e.g., casing 12, rather than a nozzle insert structure can be used to define the converging/diverging passageway with a throat region of restricted cross-sectional area. As seen in FIG. 7, rocket nozzle assembly 10 includes nozzle 24 having an optimized bell contour, or shock-free bell contour, defined by inner surface 40 of casing 12. The curvature of inner surface 40, which creates the shock-free bell contour minimizes the pressure inside divergent section 32, or $P_{noz}$ in Equation (5) above, at any given longitudinal position in the nozzle. As described above, minimizing $P_{noz}$ in Equation (5) minimizes thrust asymmetries caused by physical asymmetries in the longitudinal fin slots. It should be noted that the mathematics that define the curvature of inner surface 40, or inner surface 28 of FIG. 6C, are beyond the scope of this disclosure.

As seen in FIG. 7, casing 12 includes outer wall 14 and inner surface 40. A portion of inner surface 40 defines diverging section 32. Casing 12 defines a plurality of longitudinal fin slots, e.g., fin slots 22A-22C. Each of the plurality of fin slots extend through outer wall 14 and inner surface 40. Rocket assembly 10 of FIG. 7 further includes a plurality of fins pivotally engaged to the casing, where in the stowed position, each of the plurality of fins extends into the diverging region through a respective one of the fin slots, and where in the deployed position, each of the plurality of fins extend outwardly from the casing, as shown and described above with respect to FIGS. 5A-5C and FIGS. 6A-6C.

Figure 8:
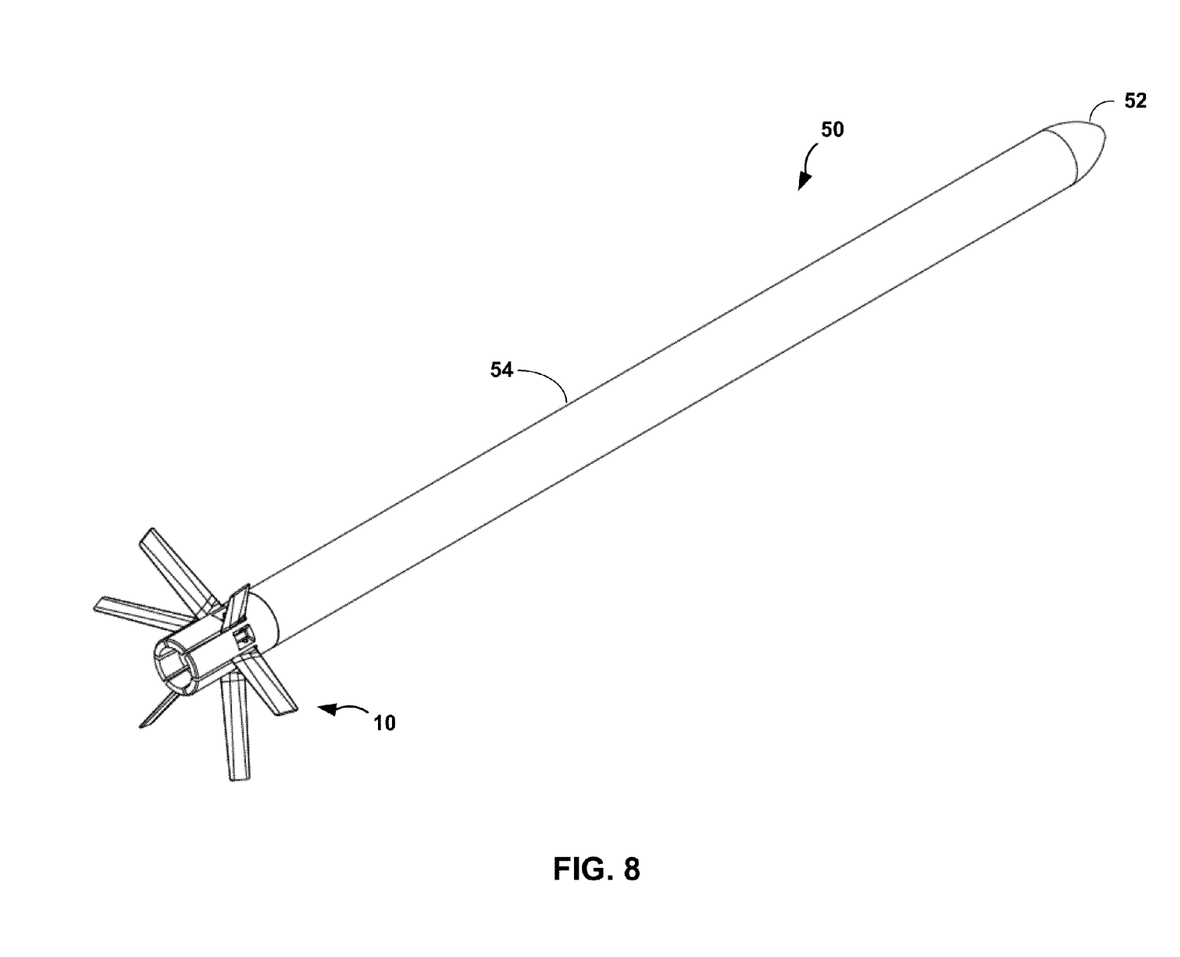
FIG. 8 is an isometric view of an example small tactical rocket that includes the rocket assembly of FIG. 5A.

FIG. 8 is an isometric view of an example small tactical rocket that includes the rocket assembly of FIG. 5A. In particular, FIG. 8 depicts tactical rocket 50, which includes rocket nozzle assembly 10 (described in detail above), payload section 52, and fuel section 54. Rocket nozzle assembly 10 is depicted in a deployed position, as described above with respect to FIGS. 6A-6C.

Various aspects of the disclosure have been described. These and other aspects are within the scope of the following claims.

The invention claimed is:

1. A rocket nozzle assembly having a stowed position and a deployed position, the assembly comprising:
   a casing comprising an outer wall and an inner surface, at least a portion of the inner surface defining a diverging region,
      wherein the casing defines a plurality of longitudinal fin slots, and wherein each of the plurality of fin slots extend through the outer wall of the casing and the inner surface of the casing, and
      wherein the diverging region defines a bell-shaped contour; and
   a plurality of fins pivotally engaged to the casing,
      wherein in the stowed position, each of the plurality of fins extends into the diverging region through a respective one of the fin slots, and
      wherein in the deployed position, each of the plurality of fins extend outwardly from the casing.

2. The assembly of claim 1, wherein the bell-shaped contour is a shock-free bell contour.

3. The assembly of claim 1, wherein the fin slots are distributed symmetrically about the casing.

4. The assembly of claim 3, wherein the fin slots form diametrically opposing pairs of fin slots.

5. The assembly of claim 1, wherein the plurality of fins comprises six fins.

6. The assembly of claim 1, wherein in the stowed position, each of the plurality of fins extends distally from a distal end of the casing.

7. The assembly of claim 1, wherein the casing is engaged to a small tactical rocket.

8. A small tactical rocket comprising:
   a rocket nozzle assembly having a stowed position and a deployed position, the assembly comprising:
   a casing comprising an outer wall and an inner surface, at least a portion of the inner surface defining a diverging region,
      wherein the casing defines a plurality of longitudinal fin slots, wherein each of the plurality of fin slots extends through the outer wall of the casing and the inner surface of the casing, and
      wherein the diverging region defines a bell-shaped contour; and
   a plurality of fins pivotally engaged to the casing,
      wherein in the stowed position, each of the plurality of fins extends into the diverging region through a respective one of the fin slots, and
      wherein in the deployed position, each of the plurality of fins extends outwardly from the casing.

9. The tactical rocket of claim 8, wherein the diverging region defines a shock-free bell contour.

10. The tactical rocket of claim 8, wherein the fin slots are distributed symmetrically about the casing.

11. The tactical rocket of claim 10, wherein the fin slots form diametrically opposing pairs of fin slots.

12. The tactical rocket of claim 8, wherein the plurality of fins comprises six fins.

13. The tactical rocket of claim 8, wherein in the stowed position, each of the plurality of fins extends distally from a distal end of the casing.

14. A rocket nozzle assembly for a small tactical rocket having a stowed position and a deployed position, the assembly comprising:
   a casing comprising an outer wall and an inner surface, at least a portion of the inner surface defining a diverging region,
      wherein the diverging region defines a shock-free bell contour,
      wherein the casing defines a plurality of longitudinal fin slots, wherein the fin slots are distributed symmetrically about the casing, and
      wherein each of the plurality of fin slots extends through the outer wall of the casing and the inner surface of the casing; and
   six fins pivotally engaged to the casing,
      wherein in the stowed position, each of the fins extends into the diverging region through a respective one of the fin slots,
      wherein in the stowed position, each of the plurality of fins extends distally from a distal end of the casing, and
      wherein in the deployed position, each of the fins extends outwardly from the casing.

15. A rocket nozzle assembly having a stowed position and a deployed position, the assembly comprising:
   a casing comprising an outer wall;
   a nozzle insert structure positioned within the casing, the insert structure comprising an inner surface, at least a portion of the inner surface of the insert structure defining a diverging region,
      wherein the casing and the insert structure define a plurality of longitudinal fin slots, and wherein each of the plurality of fin slots extend through the outer wall of the casing and the inner surface of the insert structure, and
      wherein the diverging region defines a bell-shaped contour; and
   a plurality of fins pivotally engaged to the casing,
      wherein in the stowed position, each of the plurality of fins extend into the diverging region through respective ones of the fin slots, and
   wherein in the deployed position, each of the plurality of fins extend outwardly from the casing.

* * * * *